US010279830B2

(12) United States Patent
Stahl et al.

(10) Patent No.: US 10,279,830 B2
(45) Date of Patent: May 7, 2019

(54) DISHED CASTER WHEEL POCKET FOR A PLATFORM OR DOLLY

(71) Applicant: ORBIS Corporation, Oconomowoc, WI (US)

(72) Inventors: Edward L. Stahl, Tyler, TX (US); Eric P. May, Canton, OH (US); Benjamin Joel Thompson, Johnson Creek, WI (US); Scott James Buss, Watertown, WI (US)

(73) Assignee: ORBIS Corporation, Oconomowoc, WI (US)

( * ) Notice: Subject to any disclaimer, the term of this patent is extended or adjusted under 35 U.S.C. 154(b) by 0 days.

(21) Appl. No.: 15/806,035

(22) Filed: Nov. 7, 2017

(65) Prior Publication Data

US 2018/0127010 A1 May 10, 2018

Related U.S. Application Data

(60) Provisional application No. 62/419,019, filed on Nov. 8, 2016, provisional application No. 62/419,755, filed on Nov. 9, 2016.

(51) Int. Cl.
*B62B 3/14* (2006.01)
*B62B 3/16* (2006.01)
*B62B 5/00* (2006.01)

(52) U.S. Cl.
CPC .......... *B62B 5/0093* (2013.01); *B62B 3/1476* (2013.01); *B62B 3/1492* (2013.01); *B62B 3/16* (2013.01); *B62B 2301/04* (2013.01)

(58) Field of Classification Search
CPC .......... B62B 3/16; B62B 3/14; B62B 3/1404; B62B 3/1492
See application file for complete search history.

(56) References Cited

U.S. PATENT DOCUMENTS

| | | |
|---|---|---|
| 3,073,274 A | 1/1963 | Lamb |
| 3,208,768 A | 9/1965 | Hulbert |
| 3,511,191 A | 5/1970 | Barry et al. |
| 3,581,681 A | 6/1971 | Newton |
| 3,610,720 A | 10/1971 | Hosmer |
| 3,661,099 A | 5/1972 | Shelor |
| 3,685,461 A | 8/1972 | Belcher |

(Continued)

FOREIGN PATENT DOCUMENTS

| | | |
|---|---|---|
| CA | 99478 | 4/2003 |
| CA | 2757947 A1 | 5/2012 |

(Continued)

OTHER PUBLICATIONS

Korean Intellectual Property Office, International Search Report for PCT/US2017/060651, dated Feb. 14, 2018 (4 pages).

(Continued)

*Primary Examiner* — Bryan A Evans
(74) *Attorney, Agent, or Firm* — Joseph A. Fuchs; Greensfelder, Hemker & Gale, P.C.

(57) ABSTRACT

The present invention provides a dolly having a polygonal-shaped platform having an upper surface, a lower surface, a peripheral edge having four corners, a torus-shaped pocket positioned at each corner and dimensioned to receive a wheel from an adjacent dolly, and a plurality of wheels extending from the lower surface and attached thereto.

19 Claims, 8 Drawing Sheets

(56) References Cited

U.S. PATENT DOCUMENTS

| | | |
|---|---|---|
| 3,707,929 A | 1/1973 | Lauffer |
| 3,719,157 A | 3/1973 | Arocha et al. |
| 3,720,176 A | 3/1973 | Munroe |
| 3,757,704 A | 9/1973 | Allgeyer et al. |
| 3,814,778 A | 6/1974 | Hosoda et al. |
| 3,846,348 A | 11/1974 | Horst et al. |
| 4,159,681 A | 7/1979 | Vandament |
| 4,230,049 A | 10/1980 | Horne |
| 4,241,555 A | 12/1980 | Dickens et al. |
| 4,329,231 A | 5/1982 | Hoffman et al. |
| 4,440,708 A | 4/1984 | Haataja et al. |
| 4,467,728 A | 8/1984 | Horne |
| 4,742,781 A | 5/1988 | Shuert |
| 4,822,066 A | 4/1989 | Rehrig |
| 4,824,129 A | 4/1989 | Rehrig |
| 4,972,611 A | 11/1990 | Swartz et al. |
| 5,069,358 A | 12/1991 | Avery, Jr. |
| 5,329,862 A | 7/1994 | Breezer et al. |
| 5,349,749 A | 9/1994 | Fiedler |
| 5,401,456 A | 3/1995 | Alesi, Jr. et al. |
| 5,413,052 A | 5/1995 | Breezer et al. |
| 5,445,396 A * | 8/1995 | Sebor ................. B62B 3/16 108/53.3 |
| 5,528,994 A | 6/1996 | Iseli |
| 5,590,606 A | 1/1997 | Crews et al. |
| 5,592,885 A | 1/1997 | Young, Jr. et al. |
| 5,636,577 A | 6/1997 | Gow |
| 5,687,652 A | 11/1997 | Ruma |
| 5,711,540 A * | 1/1998 | Nesting ................. B62B 3/00 280/33.998 |
| 5,829,595 A | 11/1998 | Brown et al. |
| 5,832,841 A | 11/1998 | Crews et al. |
| 5,833,207 A | 11/1998 | Hagenhoff et al. |
| 5,921,566 A | 7/1999 | Kern et al. |
| 6,012,587 A | 1/2000 | McCullough |
| 6,209,464 B1 | 4/2001 | Elder |
| 6,305,301 B1 | 10/2001 | Piper, Jr. et al. |
| 6,345,828 B1 | 2/2002 | Pool et al. |
| 6,349,951 B1 * | 2/2002 | Mogensen ............ B60B 30/10 280/33.998 |
| 6,357,366 B1 | 3/2002 | Frankenberg |
| D459,049 S | 6/2002 | Apps et al. |
| 6,420,459 B1 | 7/2002 | Horold |
| D472,028 S | 3/2003 | Stahl |
| 6,659,020 B1 | 12/2003 | Ball |
| 6,675,723 B2 | 1/2004 | Sukeva |
| 6,718,888 B2 | 4/2004 | Muirhead |
| 6,748,876 B2 | 6/2004 | Preisler et al. |
| 6,758,148 B2 | 7/2004 | Torrey et al. |
| 6,886,787 B2 | 5/2005 | Stahl |
| 6,928,933 B2 | 8/2005 | Grau |
| 6,971,518 B1 | 12/2005 | Lowry |
| 6,974,140 B2 | 12/2005 | Neuman |
| 6,998,433 B2 | 2/2006 | Overholt et al. |
| 7,036,833 B1 | 5/2006 | Berna et al. |
| 7,044,065 B2 | 5/2006 | Arai et al. |
| 7,059,617 B1 | 6/2006 | Verna |
| 7,066,477 B2 | 6/2006 | Dubois et al. |
| 7,413,698 B2 | 8/2008 | Bearse et al. |
| 7,419,457 B1 | 9/2008 | Sudeith et al. |
| 7,874,256 B2 | 1/2011 | Muirhead |
| 8,141,500 B2 | 3/2012 | Naidu et al. |
| 8,181,580 B2 | 5/2012 | Roth et al. |
| 8,215,244 B2 | 7/2012 | Apps |
| 8,261,673 B2 | 9/2012 | Ingham |
| 8,317,204 B2 | 11/2012 | Meers et al. |
| 8,418,632 B2 | 4/2013 | Linares |
| 8,544,648 B2 | 10/2013 | Cleveland et al. |
| 8,567,324 B1 | 10/2013 | Paradis et al. |
| 9,102,437 B2 | 8/2015 | Frankenberg |
| 9,327,873 B2 | 5/2016 | Frankenberg |
| 9,522,760 B2 | 12/2016 | Frankenberg |
| 9,937,942 B2 | 4/2018 | Nussbaum et al. |
| 9,988,062 B2 | 6/2018 | Stahl et al. |
| 2003/0205877 A1 | 11/2003 | Verna et al. |
| 2004/0050742 A1 | 3/2004 | Gruber |
| 2004/0168618 A1 | 9/2004 | Muirhead |
| 2005/0103237 A1 | 5/2005 | Moore, Jr. et al. |
| 2006/0011108 A1 | 1/2006 | Abu-Isa et al. |
| 2008/0149111 A1 | 6/2008 | Harrison et al. |
| 2009/0085315 A1 | 4/2009 | Meers et al. |
| 2009/0116925 A1 | 5/2009 | Juchniewicz et al. |
| 2012/0111238 A1 | 5/2012 | Frankenberg |
| 2012/0267869 A1 | 10/2012 | Hassell |
| 2013/0248674 A1 | 9/2013 | Johnson et al. |
| 2014/0175765 A1 * | 6/2014 | Tiilikainen .......... B60B 33/0005 280/79.11 |
| 2016/0207550 A1 | 7/2016 | Raeder et al. |
| 2017/0151974 A1 | 6/2017 | Stahl et al. |
| 2017/0190342 A1 * | 7/2017 | Nussbaum ............. B62B 3/02 |

FOREIGN PATENT DOCUMENTS

| | | |
|---|---|---|
| DE | 3825219 A1 | 2/1990 |
| EP | 0675829 B1 | 5/1996 |
| EP | 0807563 A2 | 11/1997 |
| EP | 1012056 B1 | 7/2001 |
| EP | 1306312 A1 | 5/2003 |
| EP | 2465784 A2 | 6/2012 |
| FR | 1596011 | 7/1970 |
| GB | 2280166 A | 1/1995 |
| GB | 2359061 A | 8/2001 |
| GB | 2377689 A | 1/2003 |
| WO | 93/16927 A1 | 9/1993 |
| WO | 03/035495 A1 | 5/2003 |
| WO | 2006/071920 A2 | 7/2006 |
| WO | 2017/078753 A1 | 5/2017 |
| WO | 2017/116682 A1 | 7/2017 |
| WO | 2017/116683 A1 | 7/2017 |
| WO | 2017/117097 A1 | 7/2017 |
| WO | 2018/089503 A1 | 5/2018 |

OTHER PUBLICATIONS

Korean Intellectual Property Office, Written Opinion of the International Searching Authority for PCT/US2017/060651, dated Feb. 14, 2018 (9 pages).

Smith Companies, "Dura-Ply Pallets" circular; date unknown (1 page).

Holden Plastics Corporation, "Thermosets: Engineering Plastics for Demanding Applications," retrieved from <http://web.archive.org/web/20060315191104/http://www.jobshop.com/techinfo/papers/plasticstermopoly.shtml> on Oct. 22, 2014 (3 pages).

Wiggins Plastics, Inc. "Thermosets: Engineering Plastics for Demanding Applications," retrieved from <http://www.jobshop.com/techinfo/papers/plasticstermpoly.shtml> on Nov. 3, 2014 (2 pages).

\* cited by examiner

DISHED CASTER WHEEL POCKET FOR A PLATFORM OR DOLLY

CROSS-REFERENCE TO RELATED APPLICATIONS

The present invention claims the benefit of U.S. Provisional Patent Application No. 62/419,019 filed Nov. 8, 2016 and U.S. Provisional Patent Application No. 62/419,755 filed Nov. 9, 2016, the contents of which are incorporated herein by reference.

FEDERALLY SPONSORED RESEARCH OR DEVELOPMENT

N/A

FIELD OF THE INVENTION

The present invention provides a mobile platform with a dished pocket for receiving a wheel from an adjacent mobile platform to form a stack of mobile platforms.

DESCRIPTION OF THE PRIOR ART

The ability to stack dollies when not in use is an important feature meant to save space and reduce return cost. Due to the mobile nature of a dolly, stacking can be difficult and unsafe if a means of safe stacking is not incorporated into the design. Today the stacking of dollies, or similar wheeled devices, is accomplished by capturing the wheels. This capturing is accomplished by either raised features, such as a perimeter lip on the deck, or a recessed pocket in the deck. These features create barriers meant to prevent a wheel from rolling off the deck below destabilizing the stack.

These pockets vary in shapes and sizes from clover-shaped (FIG. 1) sold by Schoeller Allibert to a square-shaped (FIG. 2) sold by Loadhog. The present invention provides a caster pocket that locates the wheels of a mobile platform more precisely than previous solutions. This results in safer stacking with straighter stacks and less movement throughout. This new pocket design maintains precision for both fixed and swivel casters with no repositioning required, regardless of where the wheel is located in its 180 degrees or 360 degrees of rotation.

SUMMARY OF THE INVENTION

The present invention provides a dolly with a platform with an upper surface, a lower surface, a peripheral edge, a torus-shaped pocket dimensioned to receive a wheel from an adjacent dolly, and a plurality of wheels extending from the lower surface and attached thereto.

The present invention also provides a dolly with a polygonal-shaped platform having an upper surface, a lower surface, a peripheral edge having four corners, a torus-shaped pocket positioned at each corner and dimensioned to receive a wheel from an adjacent dolly, and a plurality of wheels extending from the lower surface and attached thereto.

BRIEF DESCRIPTION OF THE DRAWINGS

To understand the present invention, it will now be described by way of example, with reference to the accompanying drawings and attachments in which.

DETAILED DESCRIPTION

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1:
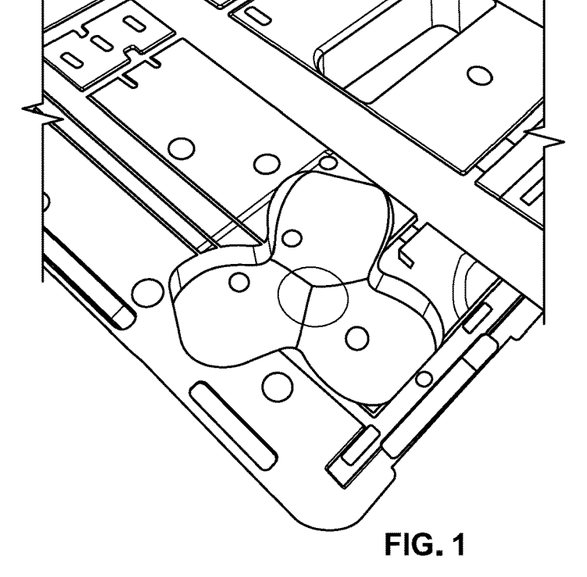
FIG. 1 is a perspective view of a prior art dolly with a clover-shaped caster pocket.
Figure 2:
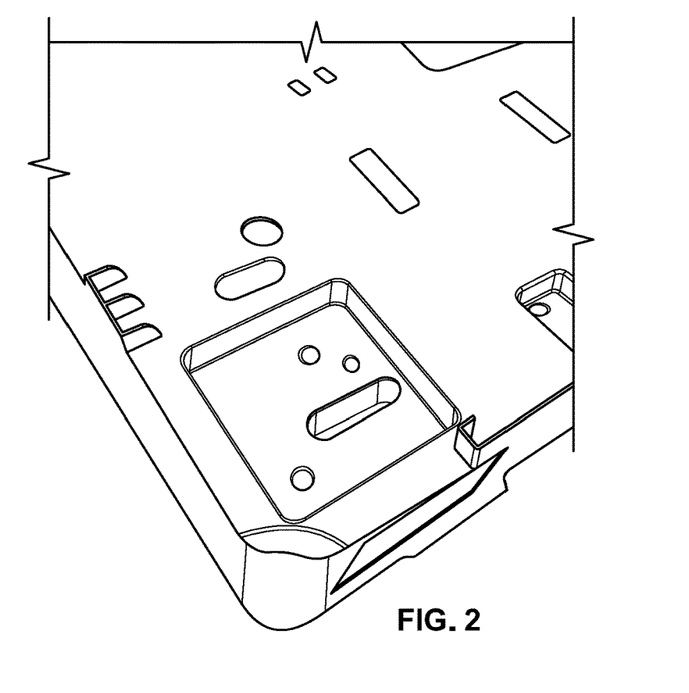
FIG. 2 is a perspective view of a prior art dolly with a square-shaped pocket.

FIGS. 1 and 2 show prior art dollies having a clover-shaped caster pocket and a square-shaped caster pocket respectively.

Figure 3:
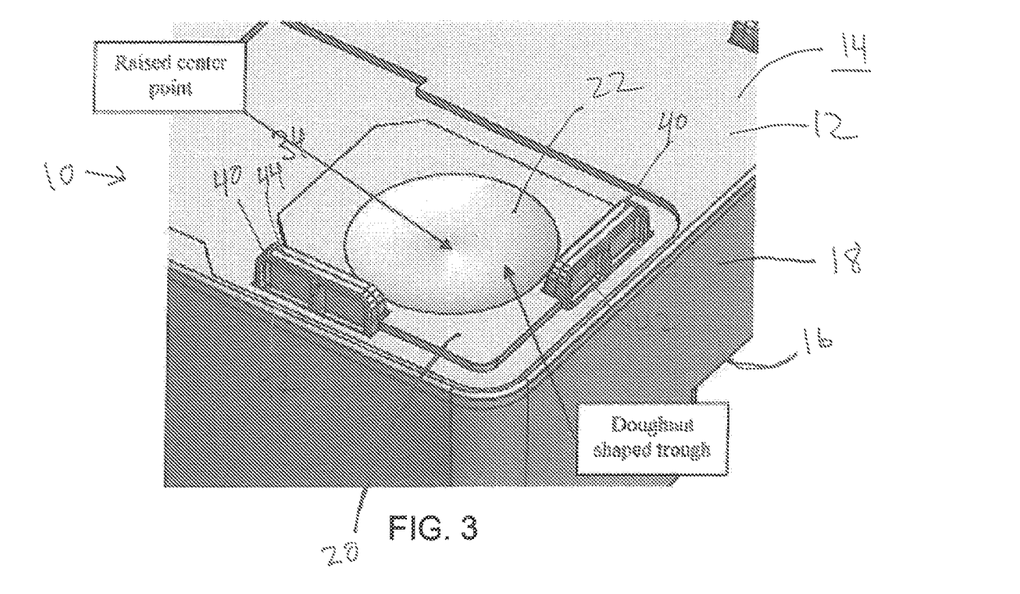
FIG. 3 is an isometric view of a dolly with a caster pocket of the present invention.
Figure 8:
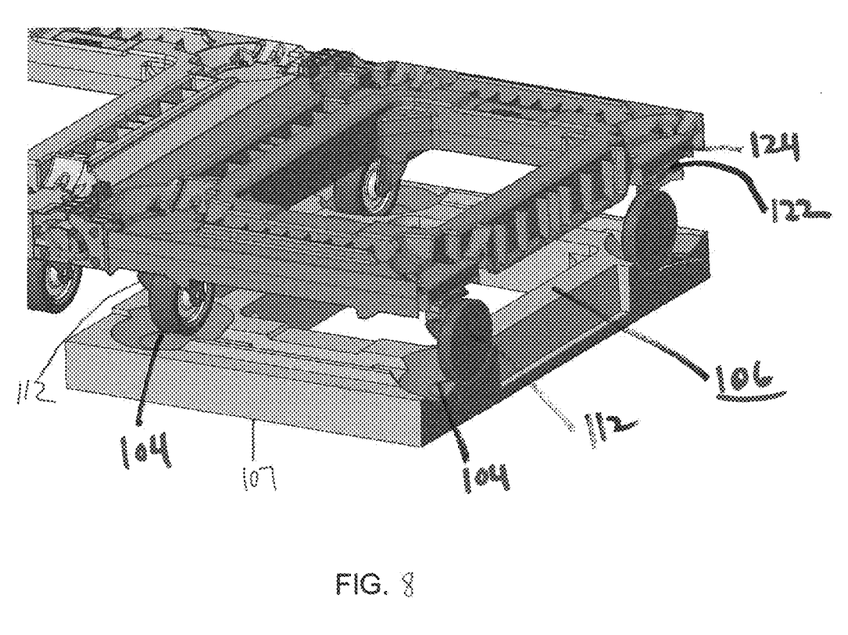
FIG. 8 is a perspective view of a stack of wheeled platforms.
Figure 9:
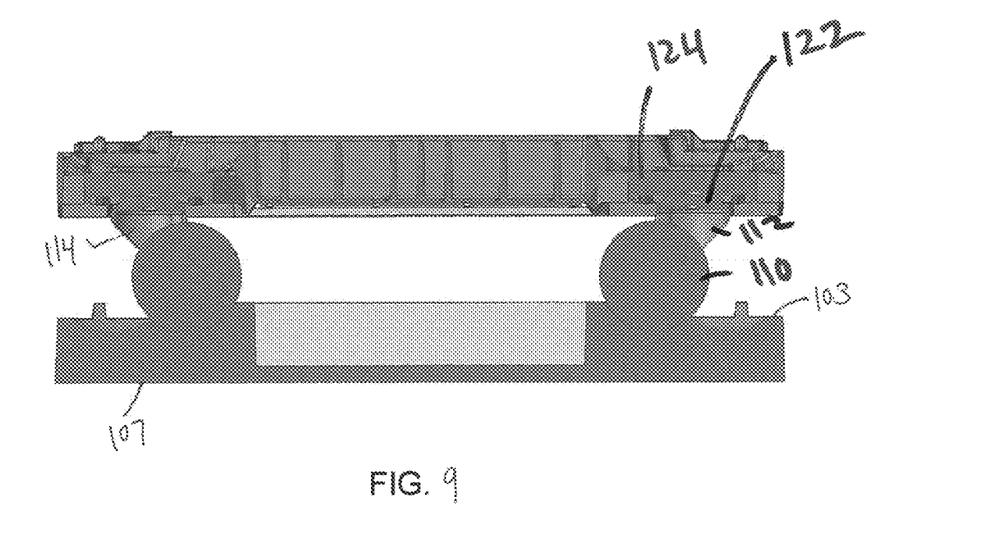
FIG. 9 is a side view in partial cross section of a stack of wheeled platforms.

FIG. 3 shows a dolly 10 with a polygonal-shaped platform 12 having an upper surface 14, a lower surface 16, and a peripheral edge 18. In one preferred aspect, the peripheral edge will have corners and preferably, in parallelepiped shaped surfaces, four corners 20. A torus-shaped pocket 22 is positioned on the upper surface 14, preferably on the peripheral edge 18, and more preferably at the corners 20. The torus-shaped pocket 22 is dimensioned to receive a wheel 24 from an adjacent dolly to form a stack of dollies as shown in FIG. 8. A more detailed description of a dolly can be found in commonly assigned U.S. Patent Publication No. 2017/0151974, which is incorporated herein in its entirety by reference and made a part hereof.

In one aspect, a pair of vertically upstanding stop walls 40 are provided at each corner on separate peripheral edges. The stop walls have faces 42 that are oriented orthogonally. The stop walls 40 can be moveable from a deployed position (as shown) to a stowed position where a top surface 44 is flush with the upper surface 14 or slightly above or below. The stop wall 40 can be spring loaded and can be moved between the stowed position to the deployed position by pressing downward on the top surface 44.

Figure 4:
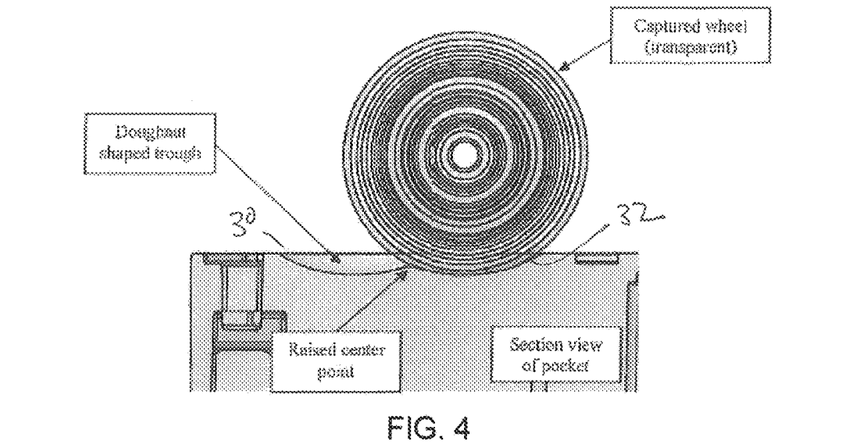
FIG. 4 is an isometric view of a caster wheel in a caster pocket of the present invention.
Figure 11:
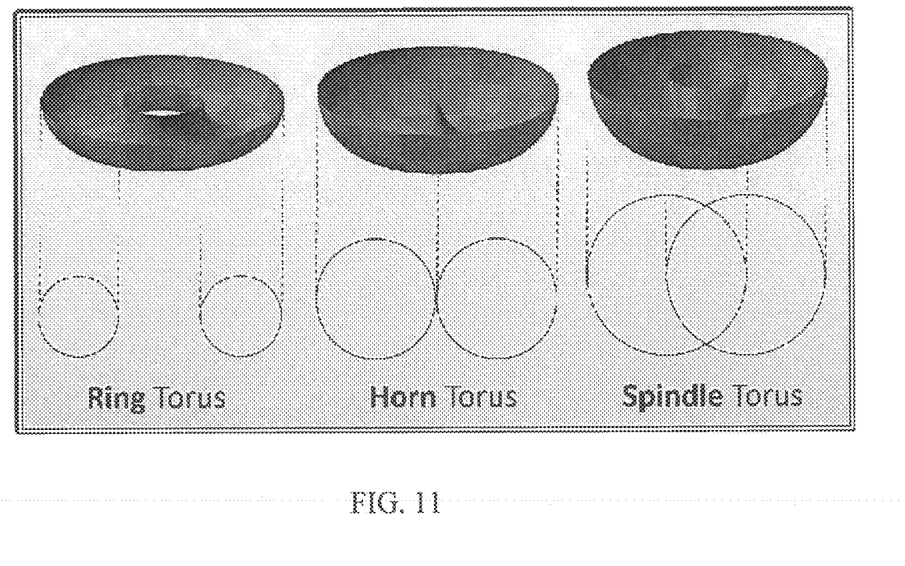
FIG. 11 is a perspective view of a ring torus, a horn torus and a spindle torus.

A torus is a surface formed by a circle having a minor axis r is rotated about a second circle having a major axis R. The ratio of the major axis to the minor axis is known as the aspect ratio. If R is greater than r the torus is known as a ring torus. (FIG. 11) This is essentially a doughnut shape. If R is equal to r than the torus is known as a horn torus. (FIG. 11) If R is less than r the torus is known as a spindle torus. The aspect ratio of the torus will be in the range of from 3:2 to 2:3, and preferably is 3:3 (1:1), or a horn torus. FIG. 4 shows the torus has two concave impressions 30, 32 and a central, upstanding point 34.

The polygonal shape can have from 3 to 8 or more sides and includes triangles, parallelepipeds, squares, rectangles, trapezoids, rhombi, pentagons, hexagons, heptagons, and octagons. Most preferably, the platform is square or rectangular in shape.

Figure 5:
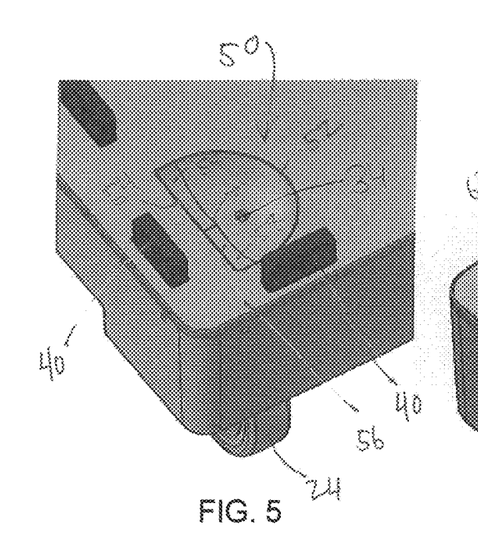
FIGS. 5 and 6 are isometric views of an alternate embodiment of a dolly with a caster pocket of the present invention.
Figure 6:
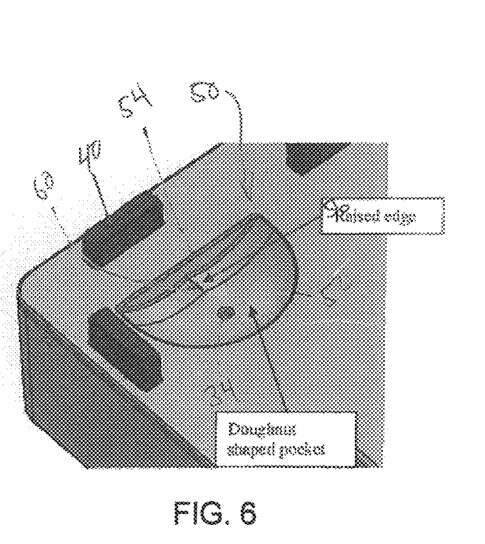
Figure 7:
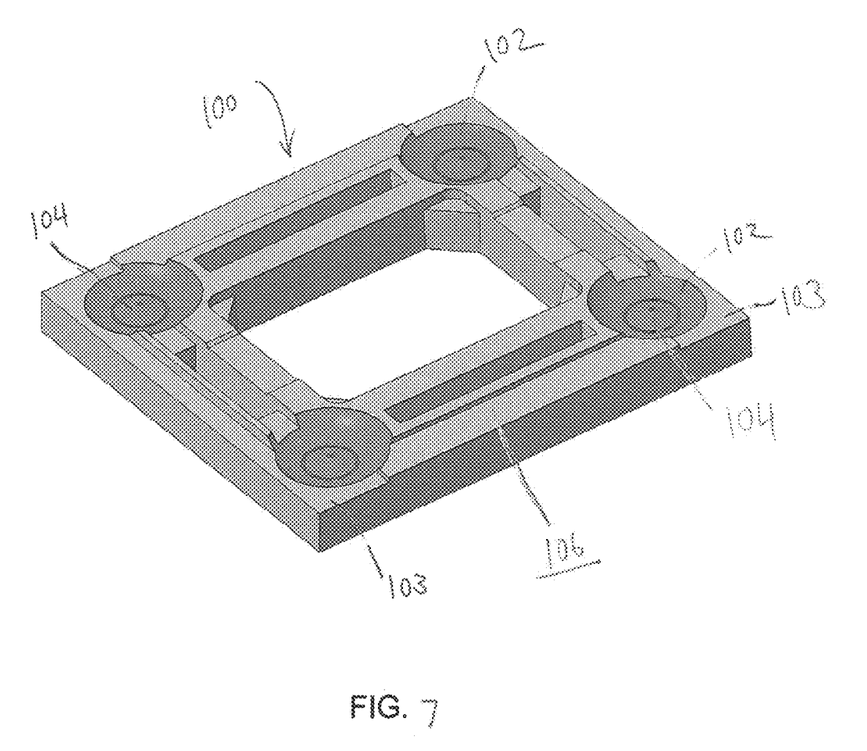
FIG. 7 is a perspective view of a platform with dished caster pockets of the present invention.

FIGS. 5 and 6 show an alternate caster pocket 50, a truncated torus having essentially a D-shape as shown with a semi-circular-shaped pocket 52 with a diametrically extending wall 54, and a raised edge 56. The raised edge 56 has two lobes 58 each having a semicircular shape sloping downward from the top surface to a low point then back upward to a raised center segment 60.

FIGS. 7-10 show another mobile platform 100, with wheels removed, having a polygonal-shaped platform, in this case rectangular, with four torus-shaped pockets 102 positioned at the four corners 103 and recessed below the upper surface 106. The pockets have a raised, circular shaped disk 104, centrally disposed in the pocket and mounted for rotational motion about an axis through the center of the pocket and perpendicular to an upper surface 106 of the platform 100. The circular disk 104 is below the upper surface 100.

Figure 10:
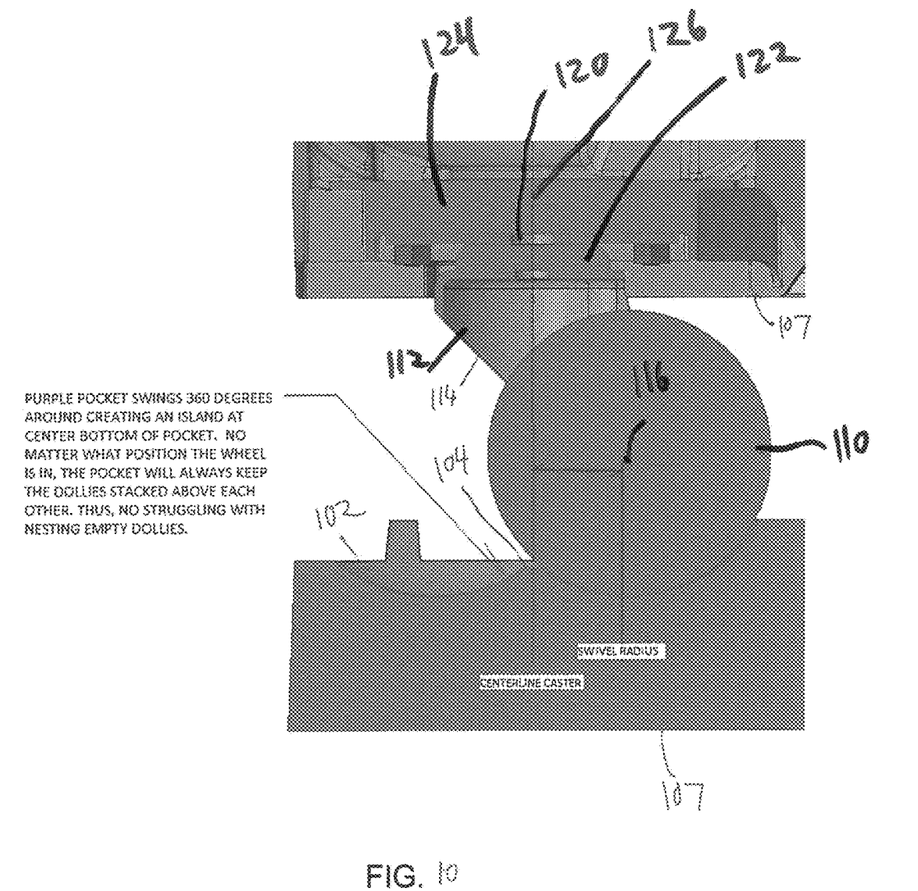
FIG. 10 is an enlarged view of a caster wheel within a dished pocket of the present invention.

As shown in FIG. 10, the caster wheel 110 is connected to the lower surface 107 of the dolly by a caster bracket 112 with two legs 114 spaced from one another to accommodate the caster wheel and having aligned through holes for an axle 116 to support rotation thereabout. The caster bracket 112 is pivotally mounted by a second axle 120 to a pivot plate 122 and a top plate 124. The caster bracket 112 and the pivot plate 122 are free to rotate about an axis 126 that extends through the second axle 120 and the top plate 124 is stationary and is bolted to the lower surface 107 of the dolly 100. Caster wheels 110 can be mounted for varying degrees of rotational freedom, for example, from 90° to 360°. The rotating disk 104 eases stacking of dollies by accommodating caster wheels being inserted into the pockets in any orientation. In one aspect, the rotating disk is supported by ball bearings (not shown).

Many modifications and variations of the present invention are possible in light of the above teachings. It is, therefore, to be understood within the scope of the appended claims the invention may be protected otherwise than as specifically described.

We claim:

1. A dolly comprising a platform having an upper surface, a lower surface, a peripheral edge, a torus-shaped pocket dimensioned to receive a wheel from an adjacent dolly and mounted for rotational movement about an axis generally perpendicular to the upper surface, and a plurality of wheels extending from the lower surface and attached thereto.

2. The dolly of claim 1 wherein the torus-shape has an aspect ratio within the range of from 3:2 to 2:3.

3. The dolly of claim 1 wherein the torus-shape has an aspect ratio of 1:1.

4. The dolly of claim 1 further comprising a stop wall positioned proximate the pocket.

5. The dolly of claim 4 wherein the stop wall extends above the upper surface.

6. The dolly of claim 5 wherein the stop wall is moveable from a deployed position to a stowed position.

7. The dolly of claim 1 wherein the pocket is generally D-shaped.

8. The dolly of claim 7 further comprising a raised edge in the pocket.

9. The dolly of claim 1 having a plurality of corners and a plurality of pockets one of each of the plurality of pockets being positioned at one of each of the plurality of corners.

10. The dolly of claim 1 wherein the wheel is a caster wheel attached to the lower surface with a swivel for rotation about a first axis perpendicular to the lower surface and the wheel is mounted for rotation about a second axis perpendicular to the first axis.

11. The dolly of claim 10 wherein the first axis of rotation is coaxially disposed with a centerline of the pocket.

12. The dolly of claim 11 wherein the first axis of rotation if extended through the wheel is spaced from a diameter line through the wheel to define a swivel radius.

13. The dolly of claim 1 wherein the wheels are caster wheels mounted for rotation about an axis from 180° to 360°.

14. A dolly comprising a polygonal-shaped platform having an upper surface, a lower surface, a peripheral edge having four corners, a torus-shaped pocket positioned at each corner and dimensioned to receive a wheel from an adjacent dolly and mounted for rotational movement about an axis generally perpendicular to the upper surface, and a plurality of wheels extending from the lower surface and attached thereto.

15. The dolly of claim 14 further comprising a first stop wall positioned proximate the pocket.

16. The dolly of claim 15 wherein the first stop wall is moveable between a deployed position and a stowed position.

17. The dolly of claim 16 further comprising a second stop wall spaced from the first stop wall.

18. The dolly of claim 17 wherein the second stop wall is moveable between a deployed position to a stowed position.

19. The dolly of claim 18 wherein the pocket is mounted for rotational motion about an axis perpendicular to the top surface.

* * * * *